Patented Nov. 3, 1931

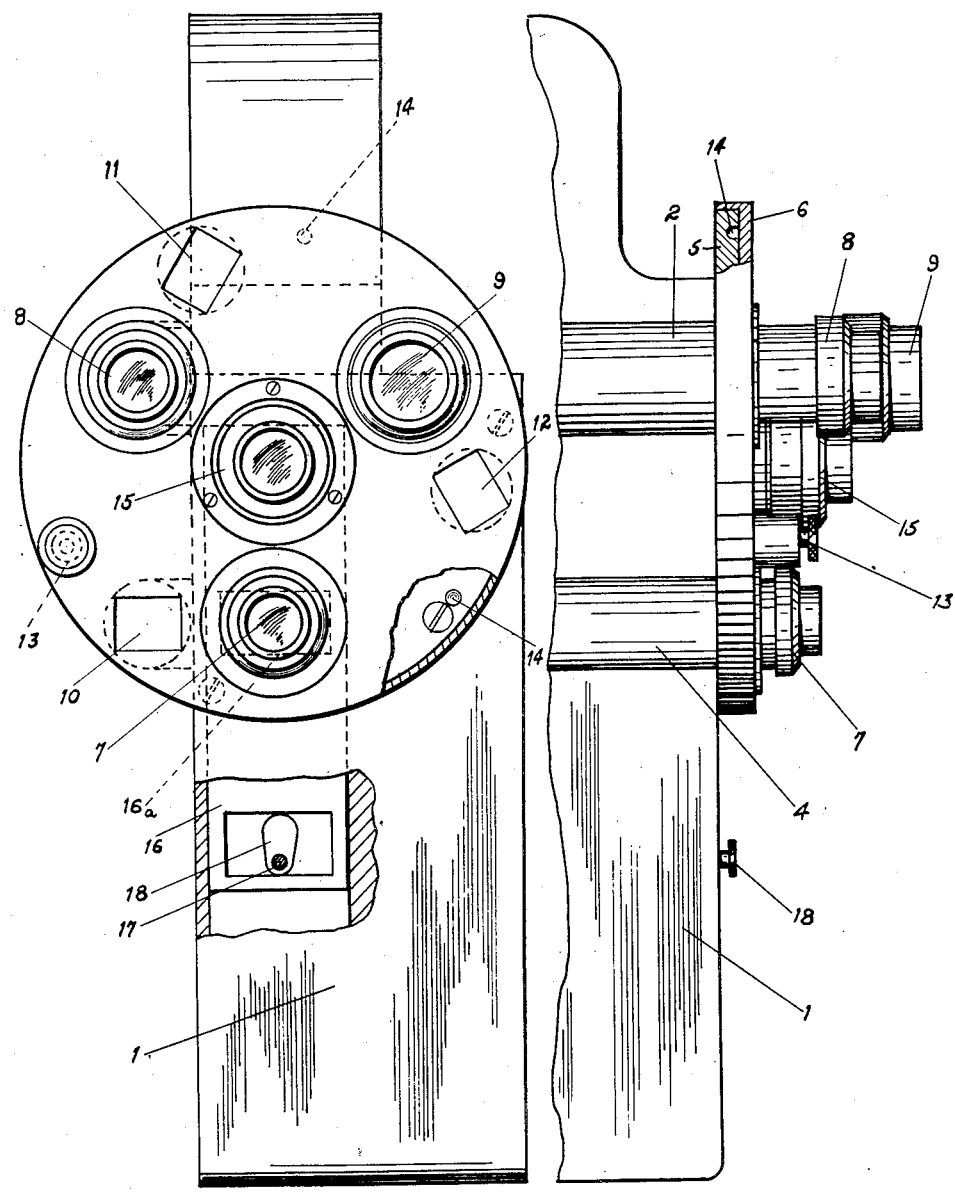

1,830,239

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

CAMERA

Application filed July 31, 1929. Serial No. 382,566.

This invention relates to improvements in lens turrets for cameras, the principal object of the invention being to provide a camera of either the ordinary "view" or "motion picture" type, having a fixed lens and a turret carrying a plurality of lenses of different focal lengths so mounted as to be capable of being selectively brought into operative relation with the camera, the present invention being an improvement in part upon that shown and described in my contemporaneously pending application, Serial No. 382,565, filed July 31, 1929.

Other objects and advantages of the invention will appear as the description proceeds.

In the drawings accompanying this specification,

Figure 1 is a front end view of a camera embodying the features of the present invention, and Figure 2 is a partly sectional side view thereof, the end wall of the camera being shown broken away.

The same characters of reference designate the same parts in both figures of the drawings.

Referring to the drawings, 1 designates the front end of a camera which is provided with a focusing tube 2, and with a finder tube 4. Secured to the wall of the camera is a disk 5. On said disk 5 is mounted for rotation a turret disk 6 carrying lenses 7, 8 and 9 of different focal lengths and cooperating finder lenses 10, 11 and 12, said turret disk also carrying a pin 13 for engagement with holes 14 formed in the disk 5, all as set forth in my copending application hereinbefore referred to.

Centrally of the disk 6 is mounted a stationary lens 15 such as is known as a fixed or universal focus lens adapted to take photographs with fairly sharp definition at from nine to one hundred feet without focusing.

From the foregoing it will be seen that I have provided a camera equipped with a lens turret by means of which lenses of different focal lengths can be selectively brought into picture-taking position and, having in addition a fixed lens.

It will be understood of course that the camera is provided with two exposure openings, one in alignment with the fixed lens 15 and the other directly below said lens and in position to be covered by one of the lenses 7, 8 and 9. It is therefore necessary to provide means for covering one of said openings when the other is open, and for that purpose I have shown herein a shutter 16 slidable past said exposure openings and which shutter is provided with an opening 16a so located as to align with the lower exposure opening when the shutter is in one position, and said shutter being adapted when in that position to close the opening communicating with the lens 15. When the shutter is in the position shown in Figure 1, its opening is in register with the lower exposure opening, while the upper end of the shutter covers the exposure opening communicating with the stationary lens 15. The shutter is movable to this position by the edge of a rotatable cam 17, which is operated by means of a button 18 secured on the end of the cam pivot which extends to the outside of the camera. If the cam is rotated from the position shown in Figure 1, the shutter will descend until the opening therein passes out of register with the lower exposure opening so that said opening will be covered by the solid portion of the shutter, while lens 15 will be uncovered. Therefore, when one of the turret lenses is to be used the cam is operated to carry the shutter to the position shown in Figure 1, and when the fixed lens is to be used the cam is rotated to permit the shutter to drop to its lowermost position.

The operation of the lens turret to selectively carry the lenses 7, 8 and 9 and their cooperating finder lenses 10, 11 and 12 into operative position is fully described in my copending application hereinbefore mentioned.

I claim:—

1. In a camera the combination of a rotatable turret carrying a plurality of lenses of different focal lengths adapted to be selectively brought into operative relation with one exposure aperture of the camera, a separate lens in fixed operative relation to another exposure aperture of the camera, and means for interrupting the operative relation of the fixed lens to its aperture when a selected lens is to be used and for interrupting the operative relation of any selected lens to its aperture when the fixed lens is to be used.

2. In a camera the combination of a rotatable turret carrying a plurality of lenses of different focal lengths adapted to be selectively brought into operative relation with one exposure aperture of the camera, and a separate fixed lens in operative relation to another exposure aperture in the camera, a slidable shutter adapted to selectively close one of said apertures, and manually operable means for actuating said shutter.

3. The combination with a camera having a pair of exposure openings, a fixed lens disposed in alignment with one of said openings, a turret rotatable about said lens and carrying a plurality of lenses of different focal lengths adapted to be selectively brought into alignment with the other of said openings, and means for covering one of said openings when the other is open.

4. The combination with a camera having a pair of exposure openings, a fixed lens disposed in alignment with one of said openings, a turret rotatable about said lens and carrying a plurality of lenses of different focal lengths adapted to be selectively brought into alignment with the other of said openings, a slidable shutter adapted to cover said openings alternately, and a manually operable cam in engagement with said shutter for actuating the same.

In testimony whereof I affix my signature.

FREEMAN H. OWENS.